(12) United States Patent
Oba

(10) Patent No.: US 11,628,882 B2
(45) Date of Patent: *Apr. 18, 2023

(54) CRUISE-ASSIST IMAGE GENERATION DEVICE, CRUISE-ASSIST IMAGE GENERATION METHOD, IN-VEHICLE CAMERA AND EQUIPMENT-CONTROL ASSIST IMAGE GENERATION DEVICE

(71) Applicant: Sony Group Corporation, Tokyo (JP)

(72) Inventor: Eiji Oba, Tokyo (JP)

(73) Assignee: Sony Group Corporation, Tokyo (JP)

( * ) Notice: Subject to any disclaimer, the term of this patent is extended or adjusted under 35 U.S.C. 154(b) by 335 days.

This patent is subject to a terminal disclaimer.

(21) Appl. No.: 16/897,658

(22) Filed: Jun. 10, 2020

(65) Prior Publication Data

US 2021/0024130 A1 Jan. 28, 2021

Related U.S. Application Data

(63) Continuation of application No. 15/363,710, filed on Nov. 29, 2016, now Pat. No. 10,696,328, which is a
(Continued)

(30) Foreign Application Priority Data

Apr. 25, 2012 (JP) .................................. 2012-099500

(51) Int. Cl.
*B62D 15/02* (2006.01)
*B60R 1/00* (2022.01)
(Continued)

(52) U.S. Cl.
CPC ............ *B62D 15/0295* (2013.01); *B60R 1/00* (2013.01); *B60R 1/002* (2013.01);
(Continued)

(58) Field of Classification Search
CPC .. B62D 15/0295; B62D 15/0275; B60R 1/00; B60R 1/002; B60R 2300/108;
(Continued)

(56) References Cited

U.S. PATENT DOCUMENTS

| | | |
|---|---|---|
| 5,408,598 A | 4/1995 | Pryor, Jr. |
| 6,529,197 B1 | 3/2003 | Ballard et al. |

(Continued)

FOREIGN PATENT DOCUMENTS

| | | |
|---|---|---|
| CN | 1863694 A | 11/2006 |
| JP | H05-127652 A | 5/1993 |

(Continued)

OTHER PUBLICATIONS

Chinese Office Action dated Jan. 4, 2016 for corresponding Chinese Application No. 201310135068.6.
(Continued)

*Primary Examiner* — Donald J Wallace
(74) *Attorney, Agent, or Firm* — Michael Best & Friedrich LLP

(57) ABSTRACT

A cruise-assist image generation device includes: a steering-angle information acquisition unit acquiring steering angle information of a steering wheel; an additional line generation unit generating a cruise assist additional line corresponding to the acquired steering angle information and formed by combination of a given number of segments; and an additional line superimposing unit superimposing the generated cruise assist additional line on a taken image of the vehicle periphery to obtain a composite image. The additional line generation unit generates respective curved lines forming part or all of the given number of segments by quadratic curve approximation using coordinate data corresponding to the acquired steering angle information and including coordinates of two endpoints and one middle point
(Continued)

representing each segment, and generating respective straight lines forming the remains of the given number of segments by collinear approximation using coordinate data corresponding to the acquired steering angle information and including coordinates of two end points representing each segment.

25 Claims, 11 Drawing Sheets

Related U.S. Application Data continuation of application No. 13/856,663, filed on Apr. 4, 2013, now Pat. No. 9,533,709.

(51) Int. Cl.
*G06T 11/00* (2006.01)
*G06T 11/20* (2006.01)
*G06T 11/60* (2006.01)

(52) U.S. Cl.
CPC .......... *B62D 15/0275* (2013.01); *G06T 11/00* (2013.01); *G06T 11/203* (2013.01); *G06T 11/60* (2013.01); *B60R 2300/108* (2013.01); *B60R 2300/305* (2013.01)

(58) Field of Classification Search
CPC . B60R 2300/305; G06T 11/00; G06T 11/203; G06T 11/60
See application file for complete search history.

(56) References Cited

U.S. PATENT DOCUMENTS

| | | | |
|---|---|---|---|
| 6,654,670 B2 | 11/2003 | Kakinami et al. | |
| 6,999,602 B2 | 2/2006 | Yoshida et al. | |
| 7,295,227 B1 | 11/2007 | Asahi et al. | |
| 7,671,860 B2 | 3/2010 | Guenter | |
| 8,004,562 B2 | 8/2011 | Inoue et al. | |
| 8,648,881 B2 | 2/2014 | Yamada | |
| 9,533,709 B2* | 1/2017 | Oba | ........................ G06T 11/60 |
| 10,696,328 B2* | 6/2020 | Oba | ................... B62D 15/0275 |
| 2001/0027363 A1 | 10/2001 | Shimazaki et al. | |
| 2002/0123829 A1 | 9/2002 | Kuriya et al. | |
| 2003/0080877 A1 | 5/2003 | Takagi et al. | |
| 2003/0108222 A1 | 6/2003 | Sato et al. | |
| 2006/0209188 A1 | 9/2006 | Mizusawa | |
| 2010/0085170 A1 | 4/2010 | Oleg | |
| 2010/0110189 A1 | 5/2010 | Kuboyama et al. | |
| 2010/0238051 A1 | 9/2010 | Suzuki et al. | |
| 2010/0245575 A1 | 9/2010 | Mori et al. | |
| 2013/0010119 A1* | 1/2013 | Mitsugi | ..................... B60R 1/00 |
| | | | 348/148 |
| 2013/0044217 A1 | 2/2013 | Ichinose et al. | |
| 2013/0147945 A1 | 6/2013 | Watanabe et al. | |
| 2014/0285665 A1 | 9/2014 | Lee et al. | |

FOREIGN PATENT DOCUMENTS

| | | |
|---|---|---|
| JP | H07-105362 A | 4/1995 |
| JP | H11-224342 A | 8/1999 |
| JP | 2001-006097 A | 1/2001 |
| JP | 2002-330428 A | 11/2002 |
| JP | 2003-199093 A | 7/2003 |
| JP | 2008-007090 A | 1/2008 |
| JP | 2008-132882 A | 6/2008 |
| JP | 2008-213647 A | 9/2008 |
| JP | 2010-088096 A | 4/2010 |
| WO | WO-2012-032809 A1 | 3/2012 |
| WO | WO-2012-073392 A1 | 6/2012 |

OTHER PUBLICATIONS

Japanese Office Action dated Oct. 27, 2015 for corresponding Japanese Application No. 2012-099500.
Ooe, Junzo "Flow of Information Communication Technology in Car (First Part)" Information Processing Japan, Corporate Juridical Person, Information Processing Society of Japan, Sep. 15, 2004. vol. 45, No. 9., pp. 944-949.

\* cited by examiner

FIG.3

| FIRST HORIZONTAL LINE | FIRST VERTICAL-LEFT LINE | FIRST VERTICAL-RIGHT LINE | SECOND HORIZONTAL LINE | SECOND VERTICAL-LEFT LINE | SECOND VERTICAL-RIGHT LINE | THIRD HORIZONTAL LINE | THIRD VERTICAL-LEFT LINE | THIRD VERTICAL-RIGHT LINE |
|---|---|---|---|---|---|---|---|---|
| Yhr1= COORDINATE 5 | Xvlt1= COORDINATE 10 | Xvrt1= COORDINATE 15 | Yhr2 | Xvlt2 | Xvrt2 | Yhr3 | Xvlt3 | Xvrt3= COORDINATE 45 |
| Yhc1= COORDINATE 4 | Xvlm1= COORDINATE 9 | Xvrm1= COORDINATE 14 | Yhc2 | Xvlm2 | Xvrm2 | Yhc3 | Xvlm3 | Xvrm3= COORDINATE 44 |
| Yhl1= COORDINATE 3 | Xvlb1= COORDINATE 8 | Xvrb1= COORDINATE 13 | Yhl2 | Xvlb2 | Xvrb2 | Yhl3 | Xvlb3 | Xvrb3= COORDINATE 43 |
| Xhc1= COORDINATE 2 | Yvlm1= COORDINATE 7 | Yvrm1= COORDINATE 12 | Xhc2 | Yvlm2 | Yvrm2 | Xhc3 | Yvlm3 | Yvrm3= COORDINATE 42 |
| Xhw1= COORDINATE 1 | Yvlh1= COORDINATE 6 | Yvrh1= COORDINATE 11 | Xhw2 | Yvlh2 | Yvrh2 | Xhw3 | Yvlh3 | Yvrh3= COORDINATE 41 |

FIG.4

| STEERING ANGLE Sa / COORDINATE POINT | -500 | ... | -480 | ... | -20 | ... | 0 | ... | +20 | ... | N | ... | +480 | ... | +500 |
|---|---|---|---|---|---|---|---|---|---|---|---|---|---|---|---|
| COORDINATE(1) | | | | | | | | | | | COORDINATE(N,1) | | | | |
| COORDINATE(2) | | | | | | | | | | | | | | | |
| COORDINATE(3) | | | | | | | | | | | | | | | |
| COORDINATE(M) | | | | | | | | | | | COORDINATE(N,M) | | | | |
| COORDINATE(44) | | | | | | | | | | | | | | | |
| COORDINATE(45) | | | | | | | | | | | COORDINATE(N,45) | | | | |

FIG.6

| | | | | | |
|---|---|---|---|---|---|
| Xhw1 | Xhc1 | Yhl1 | Yhc1 | Yhr1 | FIRST HORIZONTAL LINE |
| Yvlh1 | Yvlm1 | Xvlb1 | Xvlm1 | Xvlt1 | FIRST VERTICAL-LEFT LINE |
| Yvrh1 | Yvrm1 | Xvrb1 | Xvrm1 | Xvrt1 | FIRST VERTICAL-RIGHT LINE |
| Xhw2 | Xhc2 | Yhl2 | Yhc2 | Yhr2 | SECOND HORIZONTAL LINE |
| Yvlh2 | Yvlm2 | Xvlb2 | Xvlm2 | Xvlt2 | SECOND VERTICAL-LEFT LINE |
| Yvrh2 | Yvrm2 | Xvrb2 | Xvrm2 | Xvrt2 | SECOND VERTICAL-RIGHT LINE |
| Xhw3 | Xhc3 | Yhl3 | Yhc3 | Yhr3 | THIRD HORIZONTAL LINE |
| Xvlb3 | Xvlt3 | Yvlb3 | Yvlt3 | 0(DUMMY) | THIRD VERTICAL-LEFT LINE |
| Xvrb3 | Xvrt3 | Yvrb3 | Yvrt3 | 0(DUMMY) | THIRD VERTICAL-RIGHT LINE |

FIG.8

| | | | | | |
|---|---|---|---|---|---|
| Xhw1 | Xhc1 | | Yhc1 | | FIRST HORIZONTAL LINE |
| Yvlh1 | Yvlm1 | | Xvlm1 | | FIRST VERTICAL-LEFT LINE |
| Yvrh1 | Yvrm1 | | Xvrm1 | | FIRST VERTICAL-RIGHT LINE |
| Xhw2 | Xhc2 | | Yhc2 | | SECOND HORIZONTAL LINE |
| Yvlh2 | Yvlm2 | | Xvlm2 | | SECOND VERTICAL-LEFT LINE |
| Yvrh2 | Yvrm2 | | Xvrm2 | | SECOND VERTICAL-RIGHT LINE |
| Xhw3 | Xhc3 | | Yhc3 | | THIRD HORIZONTAL LINE |
| | Xvlt3 | | Yvlt3 | | THIRD VERTICAL-LEFT LINE |
| | Xvrt3 | | Yvrt3 | | THIRD VERTICAL-RIGHT LINE |

CRUISE ASSIST ADDITIONAL LINE

FIG.12

| Xhw1 | Xhc1 | Yhl1 | Yhc1 | Yhr1 | FIRST HORIZONTAL LINE |
|---|---|---|---|---|---|
| Yvlh1 | Yvlm1 | Xvlb1 | Xvlm1 | Xvlt1 | FIRST VERTICAL-LEFT LINE |
| Xhw2 | Xhc2 | Yhl2 | Yhc2 | Yhr2 | SECOND HORIZONTAL LINE |
| Yvlh2 | Yvlm2 | Xvlb2 | Xvlm2 | Xvlt2 | SECOND VERTICAL-LEFT LINE |

CRUISE-ASSIST IMAGE GENERATION DEVICE, CRUISE-ASSIST IMAGE GENERATION METHOD, IN-VEHICLE CAMERA AND EQUIPMENT-CONTROL ASSIST IMAGE GENERATION DEVICE

CROSS REFERENCES TO RELATED APPLICATIONS

This Application is a Continuation Application of application Ser. No. 15/363,710, filed Nov. 29, 2016, which is a Continuation Application of application Ser. No. 13/856,663, filed Apr. 4, 2013, now U.S. Pat. No. 9,533,709, issued on Jan. 3, 2017, which claims priority to Japanese Patent Application JP 2012-099500 filed in the Japan Patent Office on Apr. 25, 2012, the entire contents of which are hereby incorporated by reference.

FIELD

The present disclosure relates to a cruise-assist image generation device, a cruise-assist image generation method, an in-vehicle camera and an equipment-control assist image generation device, and particularly relates to a cruise-assist image generation device and so on generating a composite image in which a cruise assist additional line is superimposed on a taken image.

BACKGROUND

A technique is known in related art, in which cruise assist is realized by displaying on a monitor a composite image in which a cruise assist additional line indicating a cruise-estimation vehicle width track of a vehicle is superimposed on a taken image of the vehicle periphery as disclosed in, for example, JP-A-2002-330428 (Patent Document 1).

The cruise-estimation vehicle width track of the vehicle to be fixed by an individual vehicle design or a camera design eigenvalue differs according to vehicles, and is fixed in accordance with a steering angle of the vehicle at that time. Accordingly, the setting of the cruise assist additional line (a dynamic guide line) corresponding to the steering angle of the vehicle is performed by a microprocessor having relatively abundant ability in calculation processing such as a camera controller ECU or a navigation ECU.

SUMMARY

In the above system of the related-art configuration, an expensive ECU is indispensable between the camera and the monitor such as an LCD. Therefore, it is difficult to provide a display function of the dynamic guide line, which is highly convenient in driving/steering, for low-price vehicles.

In view of the above, it is desirable to easily provide the display function of the dynamic guide line, which is highly convenient in driving/steering, for low-price vehicles.

An embodiment of the present disclosure is directed to a cruise-assist image generation device including a steering-angle information acquisition unit acquiring steering angle information of a steering wheel, an additional line generation unit generating a cruise assist additional line corresponding to the acquired steering angle information and formed by combination of a given number of segments, and an additional line superimposing unit superimposing the generated cruise assist additional line on a taken image of the vehicle periphery to obtain a composite image, in which the additional line generation unit generates respective curved lines forming part or all of the given number of segments by quadratic curve approximation using coordinate data corresponding to the acquired steering angle information and including coordinates of two endpoints and one middle point representing each segment, and generates respective straight lines forming the remains of the given number of segments by collinear approximation using coordinate data corresponding to the acquired steering angle information and including coordinates of two end points representing each segment.

In the embodiment of the present disclosure, steering angle information of the steering wheel is acquired by the steering-angle information acquisition unit. In this case, the steering-angle information acquisition unit may acquire steering angle information of the steering wheel, for example, from an in-vehicle network. The cruise assist additional line corresponding to the acquired steering angle information and formed by combination of the given number of segments is generated by the additional line generation unit. Then, the generated cruise assist additional line is superimposed on the taken image of the vehicle periphery by the additional line superimposing unit to obtain the composite image. The taken image may be a taken image obtained by imaging a back region of a vehicle or a side region of a vehicle.

Additionally, part of all of the given number of segments is formed by curved lines, and the remains are formed by straight lines. The curved lines are generated by quadratic curve approximation using coordinate data corresponding to the steering angle information and including coordinates of two end points and one middle point representing each segment. The straight lines are formed by collinear approximation using coordinate data including coordinates of two end points representing each segment.

As described above, in the embodiment of the present disclosure, the cruise assist additional line is formed by combination of the given number of segments and part or all of the given number of segments is formed by curved lines and the remains are formed by straight lines. Additionally, segments of curved lines are generated by quadratic curve approximation using coordinate data of two end points and one middle point representing each segment, and segments of straight lines are generated by collinear approximation using coordinate data of two end points representing each segment.

Accordingly, the display function of the cruise assist additional line corresponding to the steering angle of the steering wheel, namely, the display function of the dynamic guide line can be realized by a simple circuit configuration and a small capacity memory. That is, the display function of the dynamic guide line can be realized without using an expensive ECU. Accordingly, it is possible to easily provide the display function of the dynamic guideline for low-price vehicles according to the embodiment of the present disclosure.

In the embodiment of the present disclosure, one middle point may be a point positioned in the middle between the two endpoints in the horizontal direction or the vertical direction. Also in the embodiment of the present disclosure, part of end points of the given number of segments may be used in common. Accordingly, the number of coordinate data for generating the given number of segments can be reduced and further saving of the memory can be realized.

Further, in the embodiment of the present disclosure, a coordinate data storage unit storing the coordinate data may be further provided. In this case, the coordinate data storage unit may store coordinate data corresponding to discrete values of steering angles of the steering wheel, and the additional line generation unit may use the steering angle indicated by the acquired steering angle information as a target steering angle and, when coordinate data corresponding to the target steering angle does not exist in the coordinate data storage unit, may generate and use coordinate data corresponding to the target steering angle by interpolation processing of coordinate data corresponding to steering angles in the vicinity of the target steering angle acquired from the coordinate data storage unit. The simplest method of the interpolation processing is linear interpolation processing using neighboring coordinates. It is also possible to perform curve interpolation in a higher order using quadratic curves and the like for obtaining smoother variation of steering angles.

Another embodiment of the present disclosure is directed to an in-vehicle camera including an imaging unit taking images of the vehicle periphery, and a cruise-assist image generation unit, in which cruise-assist image generation unit includes a steering-angle information acquisition unit acquiring steering angle information of a steering wheel, an additional line generation unit generating a cruise assist additional line corresponding to the acquired steering angle information and formed by combination of a given number of segments, and an additional line superimposing unit superimposing the generated cruise assist additional line on a taken image obtained in the imaging unit to obtain a composite image, in which the additional line generation unit generates respective curved lines forming part or all of the given number of segments by quadratic curve approximation using coordinate data corresponding to the acquired steering angle information and including coordinates of two endpoints and one middle point representing each segment, and generates respective straight lines forming the remains of the given number of segments by collinear approximation using coordinate data corresponding to the acquired steering angle information and including coordinates of two end points representing each segment.

In the embodiment of the present disclosure, the in-vehicle camera includes the imaging unit taking images of the vehicle periphery and the cruise-assist image generation unit. The cruise-assist image generation unit includes the steering-angle information acquisition unit, the additional line generation unit and the superimposing unit. Steering angle information of the steering wheel is acquired by the steering angle information acquisition unit. The cruise assist additional line corresponding to the acquired steering angle information and formed by combination of the given number of segments is generated by the additional line generation unit. Then, the generated cruise assist additional line is superimposed on the taken image obtained in the imaging unit to obtain a composite image by the additional line superimposing unit.

In this case, part of all of the given number of segments is formed by curved lines, and the remains are formed by straight lines. The curved lines are generated by quadratic curve approximation using coordinate data corresponding to the steering angle information and including coordinates of two end points and one middle point representing each segment. The straight lines are formed by collinear approximation using coordinate data including coordinates of two end points representing each segment.

As described above, in the embodiment of the present disclosure, the cruise assist additional line is formed by combination of the given number of segments and part or all of the given number of segments is formed by curved lines and the remains are formed by straight lines. Additionally, segments of curved lines are generated by quadratic curve approximation using coordinate data of two end points and one middle point representing each segment, and segments of straight lines are generated by collinear approximation using coordinate data of two end points representing each segment.

Accordingly, the display function of the cruise assist additional line corresponding to the steering angle of the steering wheel, namely, the display function of the dynamic guide line can be realized by a simple circuit configuration and a small capacity memory. That is, the in-vehicle camera having the display function of the dynamic guide line can be formed at low costs. Accordingly, it is possible to easily provide the display function of the dynamic guideline for low-price vehicles by using the in-vehicle camera according to the embodiment of the present disclosure.

Still another embodiment of the present disclosure is directed to a cruise-assist image generation device including an additional line generation unit generating a cruise assist additional line formed by combination of a given number of segments, a coordinate data storage unit storing coordinate data necessary for generating the segments, and an additional line superimposing unit superimposing the generated cruise assist additional line on a taken image of the vehicle periphery to obtain a composite image, in which the additional line generation unit generates respective curved lines forming part or all of the given number of segments by quadratic curve approximation using coordinate data of two end points and one middle point representing each segment.

Yet another embodiment of the present disclosure is directed to an equipment-control assist image generation device including a device monitoring external peripheral environment by an imaging device mounted on driving equipment and capable of superimposing a track on an image in which a coordinate change occurs along with a driving operation on the image obtained by the device, an additional line generation unit generating a track assist additional line corresponding to acquired steering angle information and formed by combination of a given number of segments, and an additional line superimposing unit superimposing the generated track assist additional line on a background image to obtain a composite image, in which the additional line generation unit generates respective curved lines forming part or all of the given number of segments by quadratic curve approximation using coordinate data corresponding to the acquired steering angle information and including coordinates of two end points and one middle point representing each segment, and generates respective straight lines forming the remains of the given number of segments by collinear approximation using coordinate data corresponding to the acquired steering angle information and including coordinates of two end points representing each segment.

Still yet another embodiment of the present disclosure is directed to a cruise-assist image generation device including an imaging unit equipped with a variable function of a visual field range, an additional line generation unit generating a cruise assist additional line formed by combination of a given number of segments, and an additional line superimposing unit superimposing the generated cruise assist additional line on a taken image of the vehicle periphery to obtain a composite image, in which the additional line generation unit has a unit configured to generate respective curved lines forming part or all of the given number of segments by quadratic curve approximation using coordinate data corresponding to acquired steering angle information and including coordinates of two end points and one middle point representing each segment, generate respective straight lines forming the remains of the given number of segments by collinear approximation using coordinate data corresponding to the acquired steering angle information and including coordinates of two end points representing each segment, and update and generating coordinate data necessary for generating the additional line in accordance with a variable state of the visual field range.

According to the embodiments of the present disclosure, the display function of the dynamic guide line which is highly convenient in driving/steering can be provided for low-price vehicles.

BRIEF DESCRIPTION OF THE DRAWINGS

FIG. 3 is a chart showing an example of a set of coordinate data corresponding to one steering angle to be stored in a lookup table;

FIG. 4 is a chart schematically showing the entire coordinate data to be stored in the lookup table so as to correspond to respective discrete steering angles;

FIG. 6 is a chart showing another example of a set of coordinate data corresponding to one steering angle to be stored in the lookup table;

FIG. 8 is a chart showing another example of a set of coordinate data corresponding to one steering angle to be stored in the lookup table;

FIG. 12 is a view showing an example of a set of coordinate data corresponding to one steering angle to be stored in the lookup table.

DETAILED DESCRIPTION

Hereinafter, a mode for carrying out the present disclosure (hereinafter referred to as an "embodiment") will be explained. The explanation will be made in the following order.

1. Embodiment
2. Modification Example

Figure 1:
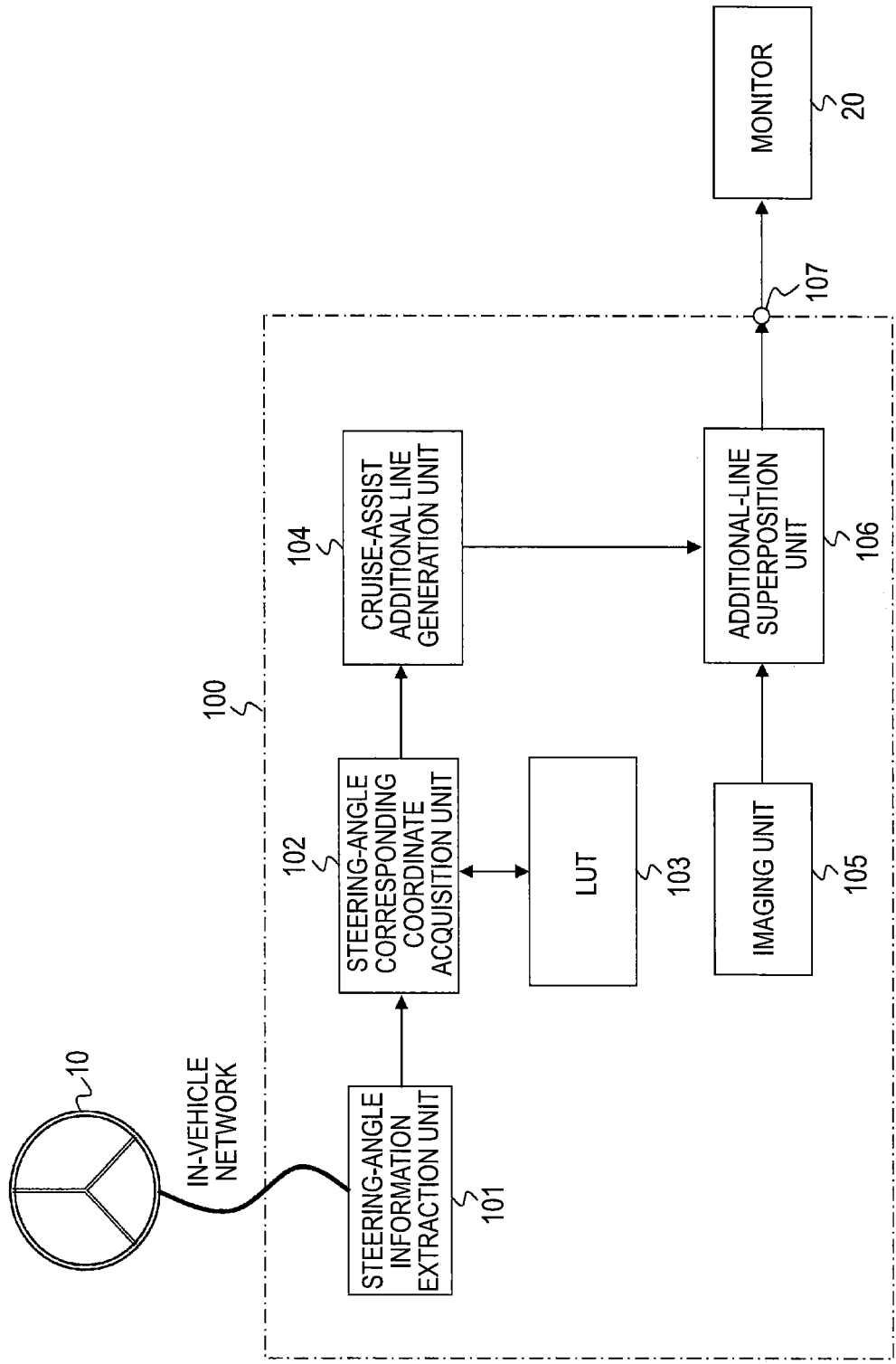
FIG. 1 is a block diagram showing a configuration example of an in-vehicle camera according to an embodiment.

<1. Embodiment>
[Configuration Example of In-Vehicle Camera]
FIG. 1 shows a configuration example of an in-vehicle camera 100 according to an embodiment. The in-vehicle camera 100 is a back camera disposed at the back of the vehicle, a side camera disposed at the side of the vehicle on a passenger's seat side or any other camera. The back camera is applied in the embodiment.

The in-vehicle camera 100 includes a steering-angle information extraction unit 101, a steering-angle corresponding coordinate acquisition unit 102, a look up table (LUT) 103, a cruise-assist additional line generation unit 104, an imaging unit 105, an additional-line superposition unit 106 and an output terminal 107. The steering-angle information extraction unit 101 extracts steering-angle information of a steering wheel 10 from an in-vehicle network. The steering-angle information extraction unit 101 forms a steering-angle information acquisition unit.

The look up table (LUT) 103 stores coordinate data corresponding to respective discrete values of steering angles of the steering wheel 10. A cruise assist additional line superimposed on the taken image to be displayed is formed by combination of a given number of segments. Part or all of the given number of segments is formed by curved lines and the remains are formed by straight lines. The look up table 103 stores coordinate data for directly or indirectly obtaining coordinate data of points representing the respective given number of segments so as to correspond to respective discrete values of steering angles. Here, points representing a curved line are two end points and one center point. Points representing a straight line are two end points.

Figure 2:
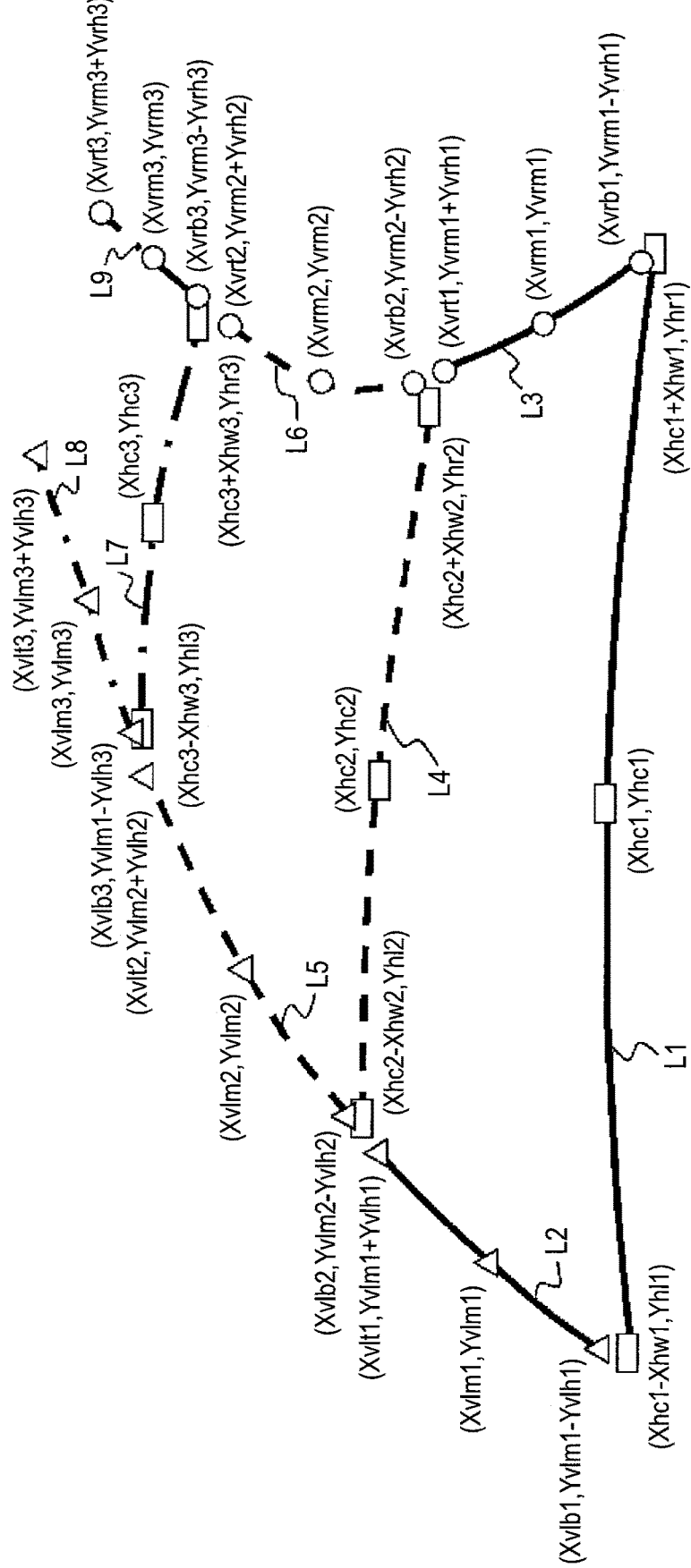
FIG. 2 is a view showing an example of a cruise assist additional line displayed at the time of reversing a vehicle.

FIG. 2 shows an example of the cruise assist additional line displayed at the time of reversing the vehicle. The cruise assist additional line includes nine segments. The nine segments includes a first horizontal line L1, a first vertical-left line L2, a first vertical-right line L3, a second horizontal line L4, a second vertical-left line L5, a second vertical-right line L6, a third horizontal line L7, a third vertical-left line L8 and a third vertical-right line L9. In the example, all nine segments are formed by curved lines.

In the first horizontal line L1, coordinates of a left end point are represented as $(Xhc1-Xhw1, Yhl1)$, coordinates of a right end point are represented as $(Xhc1+Xhw1, Yhr1)$ and coordinates of a center point are represented as $(Xhc1, Yhc1)$. In this case, the center point is positioned at the center of right-and-left two end points in the horizontal direction, two end points and one center point are represented as five coordinate data of $Xhw1, Xhc1, Yhl1, Yhc1$ and $Yhr1$. Accordingly, coordinate data stored in the lookup table (LUT) 103 is reduced from 6 to 5. The same applies to other segments.

Concerning suffixes of horizontal components, "h" denotes a horizontal line, "c" denotes a center point, "w" denotes a width in the horizontal direction, "l" denotes a left point and "r" denotes a right point, respectively. Concerning suffixes of vertical components, "v" denotes a vertical line, "m" denotes a "middle point", "h" denotes a height in the vertical direction, "b" denotes a bottom point and "t" denotes a top point.

In the first vertical-left line L2, coordinates of a bottom end point are represented as $(Xvlb1, Yvlm1-Yvlh1)$, coordinates of a top end point are represented as $(Xvlt1, Yvlm1+Yvlh1)$ and coordinates of the middle point are represented as $(Xvlt1, Yvlm1)$. In the first vertical-right line L3, coordinates of a bottom end point are represented as $(Xvrb1, Yvrm1-Yvrh1)$, coordinates of a top end point are represented as $(Xvrt1, Yvrm1+Yvrh1)$ and coordinates of a middle point are represented as $(Xvrm1, Yvrm1)$. The second horizontal line L4, the second vertical-left line L5, the second vertical-right line L6, the third horizontal line L7, the third vertical-left line L8 and the third vertical-right line L9 are represented in the same manner as the above, though the detailed description is omitted.

FIG. 3 collectively shows a set of coordinate data including 45 (3×15) coordinates corresponding to one steering angle relating to the cruise assist additional line shown in FIG. 2 to be stored in the lookup table 103. FIG. 4 schematically shows the entire coordinate data corresponding to respective discrete steering angles to be stored in the lookup table 103. The set of coordinate data corresponding to a steering angle N includes coordinate data of 45 coordinates from a coordinate (N, 1) to a coordinate (N, 45).

Figure 5:
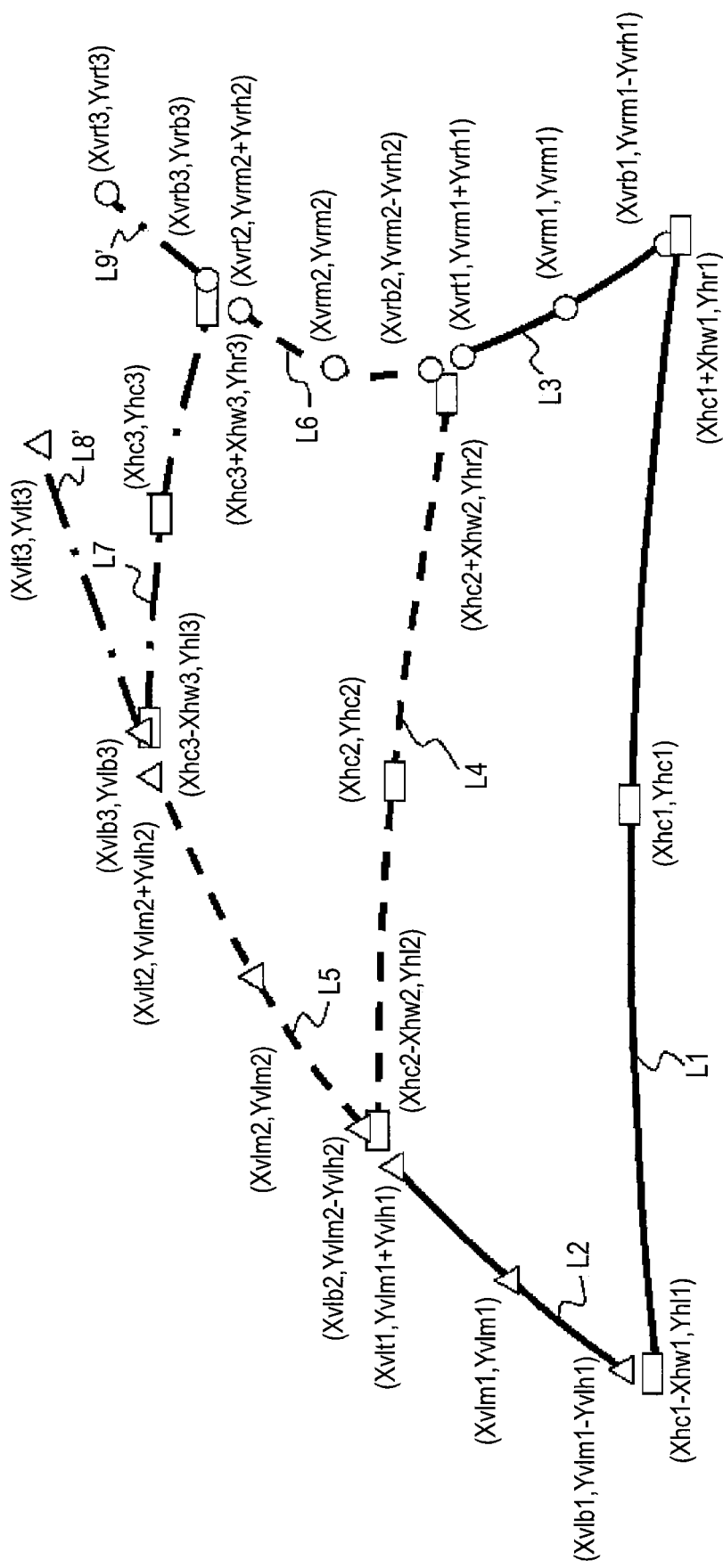
FIG. 5 is a view showing another example of the cruise assist additional line displayed at the time of reversing the vehicle.

FIG. 5 shows another example of the cruise assist additional line displayed at the time of reversing the vehicle. The cruise assist additional line also includes nine segments. The nine segments includes the first horizontal line L1, the first vertical-left line L2, the first vertical-right line L3, the second horizontal line L4, the second vertical-left line L5, the second vertical-right line L6, the third horizontal line L7, a third vertical-left line L8' and a third vertical-right line L9'. In the example, seven segments are formed by curved lines and the remaining two segments are formed by straight lines. The first horizontal line L1, the first vertical-left line L2, the first vertical-right line L3, the second horizontal line L4, the second vertical-left line L5, the second vertical-right line L6 and the third horizontal line L7 are formed by curved lines in the same manner as the example of FIG. 2. The third vertical-left line L8' and the third vertical-right line L9' are formed by straight lines.

In the third vertical-left line L8', coordinates of a bottom end point are represented as (Xvlb3, Yvlb3) and coordinates of a top end point are represented as (Xvlt3, Yvlt3), which are represented by four coordinate data of Xvlb3, Yvlb3, Xvlt3 and Yvlt3. In the third vertical-right line L9', coordinates of a bottom end point are represented as (Xvrb3, Yvrb3) and a top end point are represented as (Xvrt3, Yvrt3), which are represented by four coordinate data of Xvrb3, Yvrb3, Xvrt3 and Yvrt3.

FIG. 6 collectively shows a set of coordinate data including 43 (=2×15+1×13) coordinates corresponding to one steering angle relating to the cruise assist additional line shown in FIG. 5 to be stored in the lookup table 103.

Figure 7:
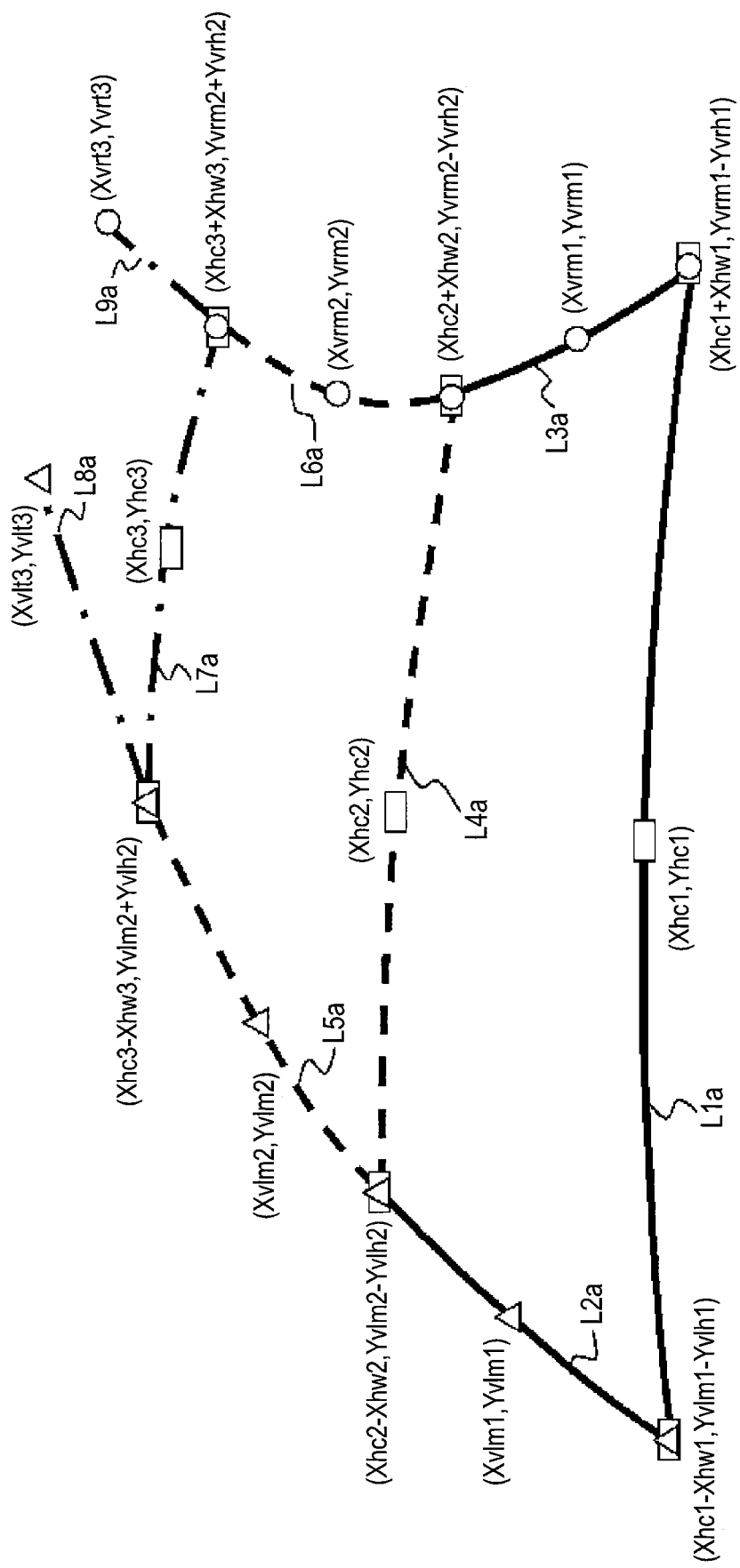
FIG. 7 is a view showing another example of the cruise assist additional line displayed at the time of reversing the vehicle.

FIG. 7 shows further another example of the cruise assist additional line displayed at the time of reversing the vehicle. In the example, one end point or both endpoints of each segment are used in common with end points of other segments, which can further reduce coordinate data to be stored in the lookup table (LUT) 103.

The cruise assist additional line also includes nine segments. The nine segments includes a first horizontal line L1a, a first vertical-left line L2a, a first vertical-right line L3a, a second horizontal line L4a, a second vertical-left line L5a, a second vertical-right line L6a, a third horizontal line L7a, a third vertical-left line L8a and a third vertical-right line L9a. In the example, seven segments are formed by curved lines and the remaining two segments are formed by straight lines in the same manner as the example shown in FIG. 5. The first horizontal line L1a, the first vertical-left line L2a, the first vertical-right line L3a, the second horizontal line L4a, the second vertical-left line L5a, the second vertical-right line L6a and the third horizontal line L7a are formed by curved lines. The third vertical-left line L8a and the third vertical-right line L9a are formed by straight lines.

In the first horizontal line L1a, coordinates of a left end point are represented as (Xhc1−Xhw1, Yvlm1−Yvlh1), coordinates of a right end point are represented as (Xhc1+Xhw1, Yvrm1−Yvrh1) and coordinates of a center point are represented as (Xhc1, Yhc1). In the second horizontal line L4a, coordinates of a left endpoint are represented as (Xhc2−Xhw2, Yvlm2−Yvlh2), coordinates of a right end point are represented as (Xhc2+Xhw2, Yvrm2−Yvrh2) and coordinates of a center point are represented as (Xhc2, Yhc2). In the third horizontal line L7a, coordinates of a left endpoint are represented as (Xhc3−Xhw3, Yvlm2+Yvlh2), coordinates of a right end point are represented as (Xhc3+Xhw3, Yvrm2+Yvrh2) and coordinates of a center point as (Xhc3, Yhc3).

In the first vertical-left line L2a, coordinates of a bottom end point are represented as (Xhc1−Xhw1, Yvlm1−Yvlh1) which are used in common with the left end point of the first horizontal line L1a, coordinates of an upper end point are represented as (Xhc2−Xhw2, Yvlm2−Yvlh2) which are used in common with the left end point of the second horizontal line L4a and coordinates of a middle point are shown as (Xvlm1, Yvlm1). In the first vertical-right line L3a, coordinates of a bottom end point are represented as (Xhc1+Xhw1, Yvrm1−Yvrh1) which are used in common with the right end point of the first horizontal line L1a, coordinates of a top end point are represented as (Xhc2+Xhw2, Yvrm2−Yvrh2) which are used in common with the right end point of the second horizontal line L4a and coordinates of a middle point are represented as (Xvrm1, Yvrm1).

In the second vertical-left line L5a, coordinates of a bottom end point are represented as (Xch2−Xhw2, Yvlm2−Yvlh2) which are used in common with the left end point of the second horizontal line L4a, coordinates of a top end point are represented as (Xhc3−Xhw3, Yvlm2+Yvlh2) which are used in common with the left end point of the third horizontal line L7a and coordinates of a middle point are represented as (Xvlm2, Yvlm2). In the second vertical-right line L6a, coordinates of a bottom end point are represented as (Xhc2+Xhw2, Yvrm2−Yvrh2) which are used in common with the right end point of the second horizontal line L4a, coordinates of a top end point are represented as (Xhc3+Xhw3, Yvrm2+Yvrh2) which are used in common with the right end point of the third horizontal line L7a and coordinates of a middle point are represented as (Xvrm2, Yvrm2).

In the third vertical-left line L8a, coordinates of a bottom end point are represented as (Xhc3−Xhw3, Yvlm2+Yvlh2) which are used in common with the left end point of the third horizontal line L7a, and coordinates of a top end point are represented as (Xvlt3, Yvlt3). In the third vertical-right line L9a, coordinates of a bottom end point are represented as (Xhc3+Xhw3, Yvrm2+Yvrh2) which are used in common with the right end point of the third horizontal line L7a, and coordinates of a top end point are represented as (Xvrt3, Yvrt3).

FIG. 8 collectively shows a set of coordinate data including 25 coordinates corresponding to one steering angle relating to the cruise assist additional line shown in FIG. 7 to be stored in the lookup table 103. As one end point or both end points of each segment are used in common with end points of other segments, coordinate data to be stored in the lookup table (LUT) 103 is further reduced. That is, coordinate data including 45 coordinates is necessary in the example shown in FIG. 2 in which data is not used in common, however, only coordinate data including 25 coordinates is necessary in the example of FIG. 7 in which data is used in common.

Returning to FIG. 1, the steering-angle corresponding coordinate acquisition unit 102 acquires coordinate data (coordinate data set) of points representing respective segments forming the above cruise assist additional line corresponding to the steering angle indicated by steering angle information extracted in the steering-angle information extraction unit 101. Here, when the steering angle indicated by the steering angle information is a target steering angle and coordinate data corresponding to the target steering angle exists in the lookup table 103, the steering-angle corresponding coordinate acquisition unit 102 directly acquires coordinate data corresponding to the target steering angle from the lookup table 103.

On the other hand, when coordinate data corresponding to the target steering angle does not exist in the lookup table 103, the steering-angle corresponding coordinate acquisition unit 102 acquires coordinate data corresponding to steering angles in the vicinity of the target steering angle from the lookup table 103 to generate coordinate data corresponding to the target steering angle by linear interpolation processing. The cruise assist additional line (cruise prediction line) with respect to the steering angle of the vehicle is monotone increasing/decreasing, which can keep continuity by neighbor interpolation processing.

The cruise-assist additional line generation unit 104 generates the cruise assist additional line corresponding to a present steering angle based on coordinate data (coordinate data set) acquired by the steering-angle corresponding coordinate acquisition unit 102. In this case, a segment (a curved line) included in the cruise assist additional line is generated by quadratic curve approximation using coordinate data of two end points and one middle point. A segment (straight line) included in the cruise assist additional line is generated by collinear approximation using coordinate data of two end points.

The imaging unit 105 obtains a taken image by taking an image of the vehicle periphery, that is, a back region of the vehicle in the embodiment. The imaging unit 105 is formed by, for example, a CMOS image sensor and the like. The additional-line superposition unit 106 superimposes the cruise assist additional line generated by the cruise-assist additional line generation unit 104 on the taken image obtained by the imaging unit 105 to thereby obtain a composite image. Specifically, the additional-line superposition unit 106 combines an imaging signal outputted from the imaging unit 105 with a display signal of the cruise assist additional line obtained by the cruise-assist additional line generation unit 104, outputting an imaging signal after composition.

The output terminal 107 derives the imaging signal obtained after combining the display signal of the cruise assist additional line obtained by the additional-line superposition unit 106. To the output terminal 107, for example, the monitor 20 formed by an LCD and so on is connected.

The operation of the in-vehicle camera 100 shown in FIG. 1 will be explained. In the steering-angle information extraction unit 101, steering angle information of the steering wheel 10 is extracted from the in-vehicle network. The steering angle information is supplied to the steering-angle corresponding coordinate acquisition unit 102. The steering-angle corresponding coordinate acquisition unit 102 acquires coordinate data (coordinate data set) of points representing respective segments forming the above-described cruise assist additional line, which corresponds to the steering angle indicated by the steering angle information extracted in the steering-angle information extraction unit 101. The coordinate data is supplied to the cruise-assist additional line generation unit 104.

In the cruise-assist additional line generation unit 104, the cruise assist additional line corresponding to the present steering angle is generated based on the coordinate data (coordinate data set) acquired by the steering-angle corresponding coordinate acquisition unit 102. In this case, a segment (a curved line) included in the cruise assist additional line is generated by quadratic curve approximation using coordinate data of two end points and one middle point. A segment (straight line) included in the cruise assist additional line is generated by collinear approximation using coordinate data of two end points. The cruise assist additional line is supplied to the additional-line superposition unit 106.

The taken image obtained by taking the image of the back region of the vehicle in the imaging unit 105 is supplied to the additional-line superposition unit 106. In the additional-line superposition unit 106, the cruise assist additional line generated by the cruise-assist additional line generation unit 104 is superimposed on the taken image obtained in the imaging unit 105 to thereby obtain a composite image. That is, in the additional-line superposition unit 106, the display signal of the cruise assist additional line obtained by the cruise-assist additional line generation unit 104 is combined with the imaging signal outputted from the imaging unit 105, and the imaging signal after composition is outputted.

The imaging signal after composition obtained in the additional-line superposition unit 106 is supplied to the output terminal 107 as an output of the in-vehicle camera 100. When the monitor 20 is connected to the output terminal 107, the imaging signal after composition is supplied to the monitor 20 from the output terminal 107. On the monitor 20, a taken image on which the cruise assist additional line is superimposed is displayed.

The extraction of steering angle information of the steering wheel 10 in the steering-angle information extraction unit 101 is executed repeatedly at given time intervals. When a value of the steering angle indicated by the steering angle information is different from a value of the previous time, coordinate data corresponding to the changed steering angle is acquired in the steering-angle corresponding coordinate acquisition unit 102, and the cruise assist additional line is generated in the cruise-assist additional line generation unit 104 so as to correspond to the changed steering angle. Therefore, the cruise assist additional line supplied from the cruise-assist additional line generation unit 104 to the additional-line superposition unit 106 is updated in accordance with the change in the steering angle of the steering wheel 10. Accordingly, the cruise assist additional line superimposed on the taken image is dynamically updated in accordance with the change of the steering angle of the steering wheel 10.

Figure 9:
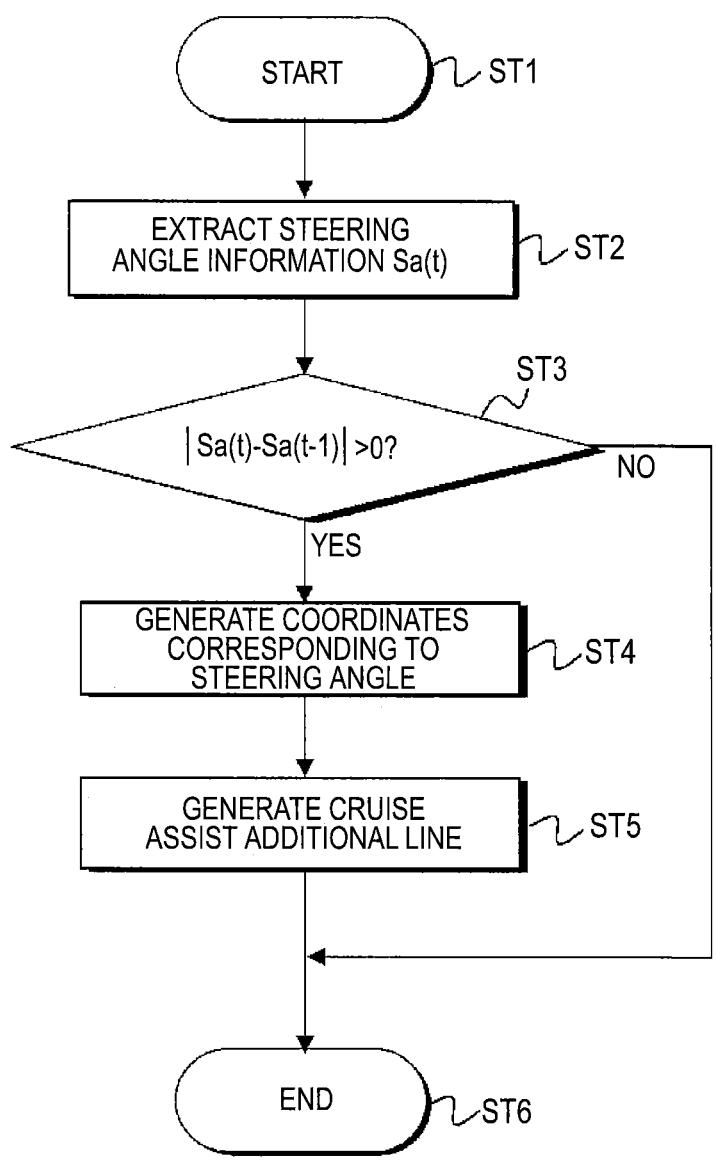
FIG. 9 is a flowchart showing an example of processing procedures in a steering-angle information extraction unit, a steering angle corresponding coordinate acquisition unit and a cruise-assist additional line generation unit at given time intervals.

A flowchart of FIG. 9 shows an example of processing procedures in the steering-angle information extraction unit 101, the steering-angle corresponding coordinate acquisition unit 102 and the cruise-assist additional line generation unit 104 performed at given time intervals. In Step ST1, the processing is started. Next, in Step ST2, steering angle information Sa (t) at a time "t" is extracted from the in-vehicle network in the steering-angle information extraction unit 101.

Next, in Step ST3, whether the steering angle information Sa (t) extracted this time is different from steering angle information Sa (t-1) extracted last time is determined. That is, whether a condition of $|Sa(t)-Sa(t-1)|>0$ is satisfied or not is determined in Step ST3. When the extracted steering angle information is the same as information extracted last time, the processing is ended immediately in Step ST6.

On the other hand, when the extracted steering angle information differs from the information extracted last time in Step ST3, coordinate data for generating respective segments forming the cruise assist additional line corresponding to the extracted steering angle information is acquired in the steering-angle corresponding coordinate acquisition unit 102 in Step ST4. Then, the cruise assist additional line corresponding to the steering angle information extracted this time is generated based on the newly-acquired coordinate data in the cruise-assist additional line generation unit 104 in Step ST5. After that, the processing is ended in Step ST6.

As described above, in the in-vehicle camera 100 shown in FIG. 1, the cruise assist additional line is formed by combination of the given number of segments and part or all of the given number of segments is formed by curved lines and the remains are formed by straight lines. Additionally, segments of curved lines are generated by quadratic curve approximation using coordinate data of two end points and one middle point representing each segment, and segments of straight lines are generated by collinear approximation using coordinate data of two end points representing each segment.

Accordingly, the display function of the cruise assist additional line corresponding to the steering angle of the steering wheel 10, namely, the display function of the dynamic guideline can be realized by a simple circuit configuration and a small capacity memory. That is, the in-vehicle camera 100 having the display function of the dynamic guide line can be formed at low costs. Accordingly, it is possible to easily provide the display function of the dynamic guideline for low-price vehicles by using the in-vehicle camera 100.

<2. Modification Example>

The example of the back camera disposed at the back of the vehicle has been shown in the above embodiment. However, the present disclosure can be also applied in the same manner to a side camera disposed at the side of the vehicle, for example, on a passenger's seat side of a vehicle, which images a side region of the vehicle and obtains a taken image to obtain the same advantages.

Figure 10:
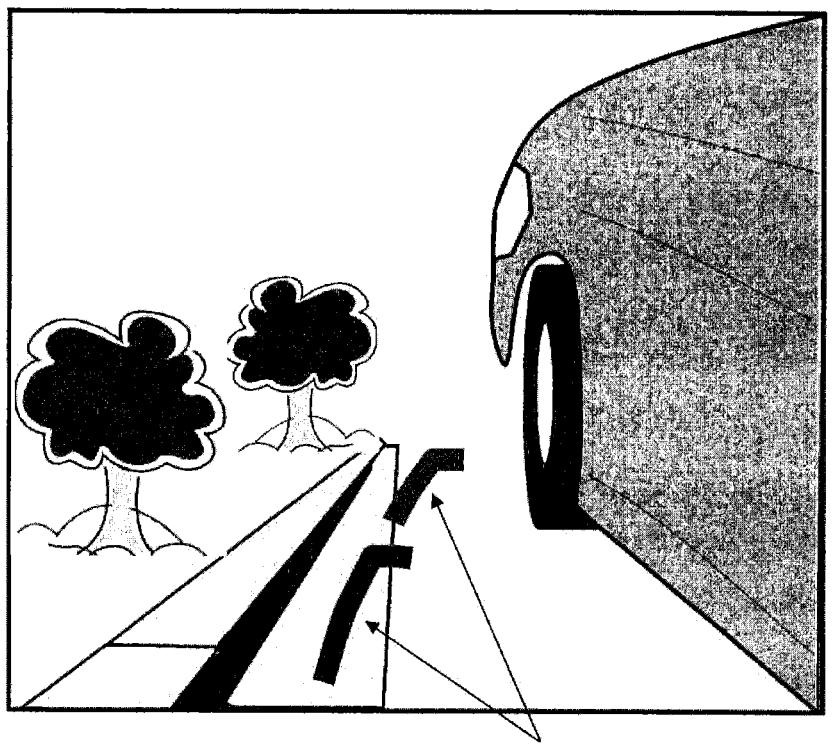
FIG. 10 is a view showing an example of a taken image of a side region of a vehicle on which a cruise assist additional line is superimposed.
Figure 11:
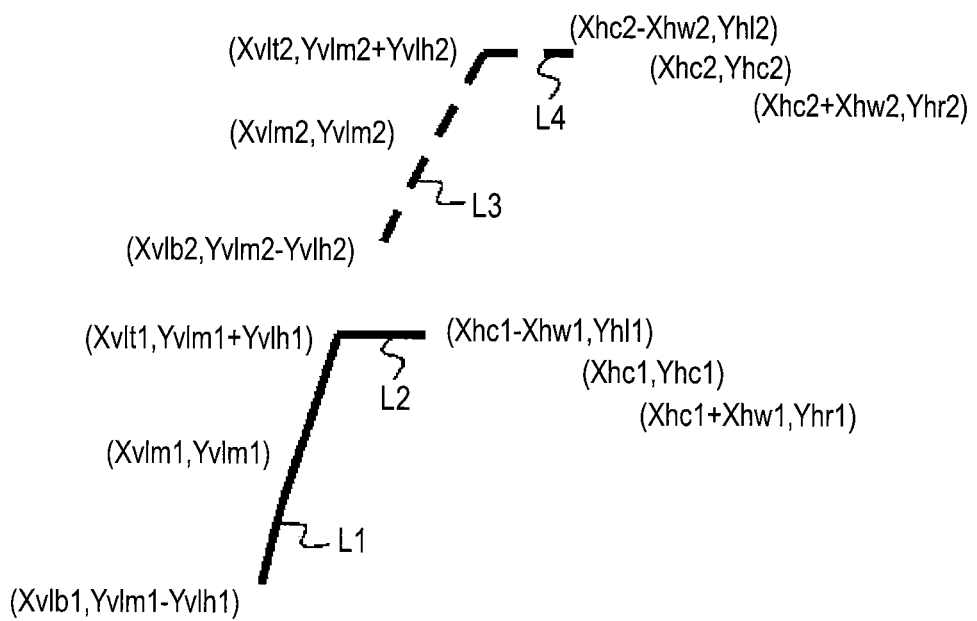
FIG. 11 is a view showing an example of the cruise assist additional line superimposed on the taken image of the side region of the vehicle.

FIG. 10 shows an example of a taken image of a side region of a vehicle on which the cruise assist additional line is superimposed. The cruise assist additional line in this example includes four segments. In this case, the lookup table (LUT) 103 stores coordinate data of points representing the four segments, which corresponds to respective discrete values of steering angles of the steering wheel 10. The cruise assist additional line includes four segments of a first vertical-left line L1, a first horizontal line L2, a second vertical-left line L3 and a second horizontal line 14 as shown in FIG. 11. In this example, all four segments are formed by curved lines.

In the first vertical-left line, coordinates of a bottom end point are represented as (Xvlb1, Yvlm1−Yvlh1), coordinates of a top end point are represented as (Xvlt1, Yvlm1+Yvlh1) and coordinates of a middle point are represented as (Xvlb1, Yvlm1). In the second horizontal line L2, coordinates of a left endpoint are represented as (Xhc1−Xhw1, Yhl1), coordinates of a right end point are represented as (Xhc1+Xhw1, Yhr1) and coordinates of a center point are represented as (Xhc1, Yhc1).

In the second vertical-left line L3, coordinates of a bottom end point are represented as (Xvlb2, Yvlm2−Yvlh2), coordinates of a top end point are represented as (Xvlt2, Yvlm2+Yvlh2) and coordinates of a middle point are represented as (Xvlm2, Yvlm2). In the second horizontal line L4, coordinates of a left end point are represented as (Xhc2−Xhw2, Yhl2), coordinates of a right end point are represented as (Xhc2+Xhw2, Yhr2) and coordinates of a center point are represented as (Xhc2, Yhc2).

FIG. 12 collectively shows a set of coordinate data including 20 (2×10) coordinates corresponding to one steering angle relating to the cruise assist additional line shown in FIG. 11 to be stored in the lookup table 103.

The operation interlocked with the steering has been explained in the above embodiment. However, a track line generated in the present disclosure is not limited to the line generated by the operation interlocked with the steering. In the technology of the present disclosure, stationary display curves can be realized by a small number of setting coordinates, therefore, the technology of the present disclosure is effective for saving the memory also when drawing a fixed cruise line.

The case where the technology of the present disclosure is mainly used for reversing the vehicle or performing parallel parking the vehicle has been shown in the above embodiment. However, the technology of the present disclosure can be also used for displaying a prediction track for movement of a motorboat and the like, a prediction track of a turning range in operation of heavy equipment such as a crane and a construction machine.

A variable function of a visual field of the imaging unit is not mentioned in the above embodiment. However, the imaging unit may be equipped with the variable function of the visual field. When the visual field of the imaging unit varies, it is necessary to change the cruise assist additional line to be superimposed on the taken image in accordance with a variable state of the visual field. In this case, a unit configured to update and generating coordinate data necessary for generating the additional line in accordance with the variable state of the visual field is provided to solve the problem.

The present disclosure can also apply the following configurations.

(1) A cruise-assist image generation device including
a steering-angle information acquisition unit acquiring steering angle information of a steering wheel,
an additional line generation unit generating a cruise assist additional line corresponding to the acquired steering angle information and formed by combination of a given number of segments, and
an additional line superimposing unit superimposing the generated cruise assist additional line on a taken image of the vehicle periphery to obtain a composite image,
in which the additional line generation unit generates respective curved lines forming part or all of the given number of segments by quadratic curve approximation using coordinate data corresponding to the acquired steering angle information and including coordinates of two endpoints and one middle point representing each segment, and generates respective straight lines forming the remains of the given number of segments by collinear approximation using coordinate data corresponding to the acquired steering angle information and including coordinates of two end points representing each segment.

(2) The cruise-assist image generation device described in the above (1),
in which one middle point is a point positioned in the middle between the two end points in the horizontal direction or the vertical direction.

(3) The cruise-assist image generation device described in the above (1) or (2),
in which part of endpoints of the given number of segments is used in common.

(4) The cruise-assist image generation device described in any of the above (1) to (3),
in which the taken image is a taken image to be obtained by imaging a back region of a vehicle.

(5) The cruise-assist image generation device described in any of the above (1) to (3),
in which the taken image is a taken image to be obtained by imaging a side region of a vehicle.

(6) The cruise-assist image generation device described in any of the above (1) to (5),
in which the steering-angle information acquisition unit acquires steering angle information of the steering wheel from an in-vehicle network.

(7) The cruise-assist image generation device described in any of the above (1) to (6), further including
a coordinate data storage unit storing the coordinate data.

(8) The cruise-assist image generation device described in the above (7),
in which the coordinate data storage unit stores coordinate data corresponding to discrete values of steering angles of the steering wheel, and
the additional line generation unit uses the steering angle indicated by the acquired steering angle information as a target steering angle and, when coordinate data corresponding to the target steering angle does not exist in the coordinate data storage unit, generates and uses coordinate data corresponding to the target steering angle by interpolation processing of coordinate data corresponding to steering angles in the vicinity of the target steering angle acquired from the coordinate data storage unit.

(9) The cruise-assist image generation device described in the above (8),
in which coordinate data corresponding to the target steering angle is generated by linear interpolation of coordinate data corresponding to steering angles in the vicinity of the target steering angle acquired from the coordinate data storage unit and the generated coordinate data is used.

(10) A cruise-assist image generation method including
acquiring steering angle information of a steering wheel,
generating a cruise assist additional line corresponding to the acquired steering angle information and formed by combination of a given number of segments, and
superimposing the generated cruise assist additional line on a taken image of the vehicle periphery to obtain a composite image,
in which respective curved lines forming part or all of the given number of segments are generated by quadratic curve approximation using coordinate data corresponding to the acquired steering angle information and including coordinates of two end points and one middle point representing each segment, and respective straight lines forming the remains of the given number of segments are generated by collinear approximation using coordinate data corresponding to the acquired steering angle information and including coordinates of two end points representing each segment in the process of generating the cruise assist additional line.

(11) An in-vehicle camera including
an imaging unit taking images of the vehicle periphery, and
a cruise-assist image generation unit,
in which cruise-assist image generation unit includes
a steering-angle information acquisition unit acquiring steering angle information of a steering wheel,
an additional line generation unit generating a cruise assist additional line corresponding to the acquired steering angle information and formed by combination of a given number of segments, and
an additional line superimposing unit superimposing the generated cruise assist additional line on a taken image obtained in the imaging unit to obtain a composite image,
in which the additional line generation unit generates respective curved lines forming part or all of the given number of segments by quadratic curve approximation using coordinate data corresponding to the acquired steering angle information and including coordinates of two endpoints and one middle point representing each segment, and generates respective straight lines forming the remains of the given number of segments by collinear approximation using coordinate data corresponding to the acquired steering angle information and including coordinates of two end points representing each segment.

(12) A cruise-assist image generation device including
an additional line generation unit generating a cruise assist additional line formed by combination of a given number of segments,
a coordinate data storage unit storing coordinate data necessary for generating the segments, and
an additional line superimposing unit superimposing the generated cruise assist additional line on a taken image of the vehicle periphery to obtain a composite image,
in which the additional line generation unit generates respective curved lines forming part or all of the given number of segments by quadratic curve approximation using coordinate data of two end points and one middle point representing each segment.

(13) An equipment-control assist image generation device including
a device monitoring external peripheral environment by an imaging device mounted on driving equipment and capable of superimposing a track on an image in which a coordinate change occurs along with a driving operation on the image obtained by the device,
an additional line generation unit generating a track assist additional line corresponding to acquired steering angle information and formed by combination of a given number of segments, and
an additional line superimposing unit superimposing the generated track assist additional line on a background image to obtain a composite image,
in which the additional line generation unit generates respective curved lines forming part or all of the given number of segments by quadratic curve approximation using coordinate data corresponding to the acquired steering angle information and including coordinates of two endpoints and one middle point representing each segment, and generates respective straight lines forming the remains of the given number of segments by collinear approximation using coordinate data corresponding to the acquired steering angle information and including coordinates of two end points representing each segment.

(14) A cruise-assist image generation device including
an imaging unit equipped with a variable function of a visual field range,
an additional line generation unit generating a cruise assist additional line formed by combination of a given number of segments, and
an additional line superimposing unit superimposing the generated cruise assist additional line on a taken image of the vehicle periphery to obtain a composite image,
in which the additional line generation unit has a unit configured to
generate respective curved lines forming part or all of the given number of segments by quadratic curve approximation using coordinate data corresponding to acquired steering angle information and including coordinates of two endpoints and one middle point representing each segment, generate respective straight lines forming the remains of the given number of segments by collinear approximation using coordinate data corresponding to the acquired steering angle information and including coordinates of two end points representing each segment and update and generating coordinate data necessary for generating the additional line in accordance with a variable state of the visual field range.

It should be understood by those skilled in the art that various modifications, combinations, sub-combinations and alterations may occur depending on design requirements and other factors insofar as they are within the scope of the appended claims or the equivalents thereof.

What is claimed is:

1. An image signal processing apparatus comprising:
    a steering angle information receiving circuitry configured to receive steering angle information from an in-vehicle network; and
    an image processing circuitry configured to
        retrieve a data set from a plurality of data sets based on the steering angle information that is received, each data set of the plurality of data sets including coordinate data corresponding to a different steering angle of a plurality of steering angles,
        generate a guideline formed by a combination of a number of first direction segments and a number of second direction segments based on the data set retrieved from the plurality of data sets,
        superimpose the guideline on an image of a vehicle periphery,
        output the image with the guideline that has been superimposed to a display, and
        update the guideline based on a change of the steering angle information,
    wherein a first end point coordinate of a first segment of the number of first direction segments is the same coordinate as a first end point coordinate of a first segment of the number of second direction segments,
    wherein a second end point coordinate of the first segment of the number of first direction segments is the same coordinate as a first end point coordinate of a second segment of the number of first direction segments, and
    wherein a second end point coordinate of the first segment of the number of second direction segments is the same coordinate as a first end point coordinate of a second segment of the number of second direction segments.

2. The image signal processing apparatus according to claim 1, wherein, to acquire the steering angle information from the in-vehicle network, the steering angle information receiving circuitry is further configured to acquire, repeatedly at a time interval, the steering angle information of a steering wheel.

3. The image signal processing apparatus according to claim 1, further comprising:
    a memory configured to store the plurality of data sets, each data set of the plurality of data sets includes coordinate data corresponding to the different steering angle of the plurality of steering angles.

4. The image signal processing apparatus according to claim 3, wherein the memory is further configured to store the coordinate data of the each data set of the plurality of data sets corresponding to a discrete value associated with the different steering angle of the plurality of steering angles, and
    wherein the steering angle information receiving circuitry is further configured to
        receive the steering angle information of a target steering angle, and
        generate target coordinate data corresponding to the target steering angle by interpolation processing of the coordinate data corresponding to the different steering angle of the plurality of steering angles in a vicinity of the target steering angle.

5. The image signal processing apparatus according to claim 4, wherein the target coordinate data corresponding to the target steering angle is generated by linear interpolation of the coordinate data corresponding to the different steering angle of the plurality of steering angles in the vicinity of the target steering angle, and
    wherein the memory is configured to store the target coordinate data in one of the plurality of data sets corresponding to the target steering angle.

6. The image signal processing apparatus according to claim 1, wherein, to generate the guideline formed by the combination of the number of first direction segments and the number of second direction segments, the image processing circuitry is further configured to generate one or more curved lines to represent at least one of the number of first direction segments or at least one of the number of second direction segments by quadratic curve approximation using the coordinate data from the data set selected from the plurality of data sets,
    wherein the coordinate data includes coordinates of at least two end points representing the at least one of the number of first direction segments or the at least one of the number of second direction segments, and generate one or more straight lines to represent at least a second one of the number of first direction segments or at least a second one of the number of second direction segments by collinear approximation using the coordinate data from the data set selected from the plurality of data sets.

7. The image signal processing apparatus according to claim 6, wherein one middle point is a point positioned in the middle between the at least two end points in a horizontal direction or a vertical direction.

8. The image signal processing apparatus according to claim 1, wherein the image of the vehicle periphery is an image of a back region of a vehicle.

9. The image signal processing apparatus according to claim 1, wherein the image of the vehicle periphery is an image of a side region of a vehicle.

10. The image signal processing apparatus according to claim 1, further comprising:
    an image sensor configured to capture the image of the vehicle periphery.

11. A system comprising:
    an imaging device configured to capture an image of a vehicle periphery;
    a steering angle information receiving circuitry configured to receive steering angle information via an in-vehicle network; and
    an image processing circuitry configured to
        retrieve a data set from a plurality of data sets based on the steering angle information that is received, each data set of the plurality of data sets including coordinate data corresponding to a different steering angle of a plurality of steering angles,
        generate a guideline formed by a combination of a number of first direction segments and a number of second direction segments based on the data set retrieved from the plurality of data sets, superimpose the guideline on the image of the vehicle periphery, output the image with the guideline that has been superimposed to a display, and update the guideline based on a change of the steering angle information, wherein a first end point coordinate of a first segment of the number of first direction segments is the same coordinate as a first end point coordinate of a first segment of the number of second direction segments, wherein a second end point coordinate of the first segment of the number of first direction segments is the same coordinate as a first end point coordinate of a second segment of the number of first direction segments, and wherein a second end point coordinate of the first segment of the number of second direction segments is the same coordinate as a first end point coordinate of a second segment of the number of second direction segments.

12. The system according to claim 11, wherein, to acquire the steering angle information via the in-vehicle network, the steering angle information receiving circuitry is further configured to acquire, repeatedly at a time interval, the steering angle information of a steering wheel.

13. The system according to claim 11, further comprising:
a memory configured to store the plurality of data sets, each data set of the plurality of data sets includes coordinate data corresponding to the different steering angle of the plurality of steering angles.

14. The system according to claim 13, wherein the memory is further configured to store the coordinate data of the each data set of the plurality of data sets corresponding to a discrete value associated with the different steering angle of the plurality of steering angles, and wherein the steering angle information receiving circuitry is further configured to
acquire the steering angle information of a target steering angle, and
generate target coordinate data corresponding to the target steering angle by interpolation processing of the coordinate data corresponding to the different steering angle of the plurality of steering angles in a vicinity of the target steering angle.

15. The system according to claim 14, wherein the target coordinate data corresponding to the target steering angle is generated by linear interpolation of the coordinate data corresponding to the different steering angle of the plurality of steering angles in the vicinity of the target steering angle, and wherein the memory is configured to store the target coordinate data in one of the plurality of data sets corresponding to the target steering angle.

16. The system according to claim 11, wherein, to generate the guideline formed by the combination of the number of first direction segments and the number of second direction segments, the image processing circuitry is further configured to generate one or more curved lines to represent at least one of the number of first direction segments or at least one of the number of second direction segments by quadratic curve approximation using the coordinate data from the data set selected from the plurality of data sets, wherein the coordinate data includes coordinates of at least two end points representing the at least one of the number of first direction segments or the at least one of the number of second direction segments, and generate one or more straight lines to represent at least a second one of the number of first direction segments or at least a second one of the number of second direction segments by collinear approximation using the coordinate data from the data set selected from the plurality of data sets.

17. The system according to claim 11, wherein the image of the vehicle periphery is an image of a back region of a vehicle.

18. The system according to claim 11, wherein the image of the vehicle periphery is an image of a side region of a vehicle.

19. The system according to claim 15, wherein one middle point is a point positioned in the middle between the at least two end points in a horizontal direction or a vertical direction.

20. An image processing method, the method comprising:
acquiring an image of a vehicle periphery;
acquiring, with a steering angle information acquisition circuitry, steering angle information from an in-vehicle network;
retrieving, with an image processing circuitry, a data set from a plurality of data sets based on the steering angle information that is acquired, each data set of the plurality of data sets including coordinate data corresponding to a different steering angle of a plurality of steering angles;
generating, with the image processing circuitry, a guideline formed by a combination of a number of first direction segments and a number of second direction segments based on the data set retrieved from the plurality of data sets;
superimposing, with the image processing circuitry, the guideline on the image of the vehicle periphery;
outputting, with the image processing circuitry, the image with the guideline that has been superimposed to a display; and
updating, with the image processing circuitry, the guideline based on a change of the steering angle information,
wherein a first end point coordinate of a first segment of the number of first direction segments is the same coordinate as a first end point coordinate of a first segment of the number of second direction segments,
wherein a second end point coordinate of the first segment of the number of first direction segments is the same coordinate as a first end point coordinate of a second segment of the number of first direction segments, and
wherein a second end point coordinate of the first segment of the number of second direction segments is the same coordinate as a first end point coordinate of a second segment of the number of second direction segments.

21. The image processing method according to claim 20, wherein acquiring the steering angle information from the in-vehicle network further includes acquiring, repeatedly at a time interval, the steering angle information of a steering wheel.

22. The image processing method according to claim 20, further comprising:
acquiring, with the steering angle information acquisition circuitry, the steering angle information of a target steering angle; and
generating, with the steering angle information acquisition circuitry, target coordinate data corresponding to the target steering angle by interpolation processing of the coordinate data corresponding to the different steering angle of the plurality of steering angles in a vicinity of the target steering angle.

23. The image processing method according to claim 22, wherein generating the target coordinate data corresponding to the target steering angle further includes linearly interpolating the coordinate data corresponding to the different steering angle of the plurality of steering angles in the vicinity of the target steering angle, the method further comprising:

storing the target coordinate data in one of the plurality of data sets corresponding to the target steering angle.

24. The image processing method according to claim 20, wherein generating the guideline formed by the combination of the number of first direction segments and the number of second direction segments further includes generating one or more curved lines to represent at least one of the number of first direction segments or at least one of the number of second direction segments by quadratic curve approximation using the coordinate data from the data set selected from the plurality of data sets, the coordinate data including coordinates of at least two end points representing the at least one of the number of first direction segments or the at least one of the number of second direction segments; and generating one or more straight lines to represent at least a second one of the number of first direction segments or at least a second one of the number of second direction segments by collinear approximation using the coordinate data from the data set selected from the plurality of data sets.

25. The image processing method according to claim 20, wherein acquiring the image of the vehicle periphery further includes capturing, with an image sensor, the image of the vehicle periphery.

* * * * *